Feb. 6, 1934.  O. FREDRICKSON  1,946,018
SLEIGH
Filed Feb. 1, 1933  4 Sheets-Sheet 2
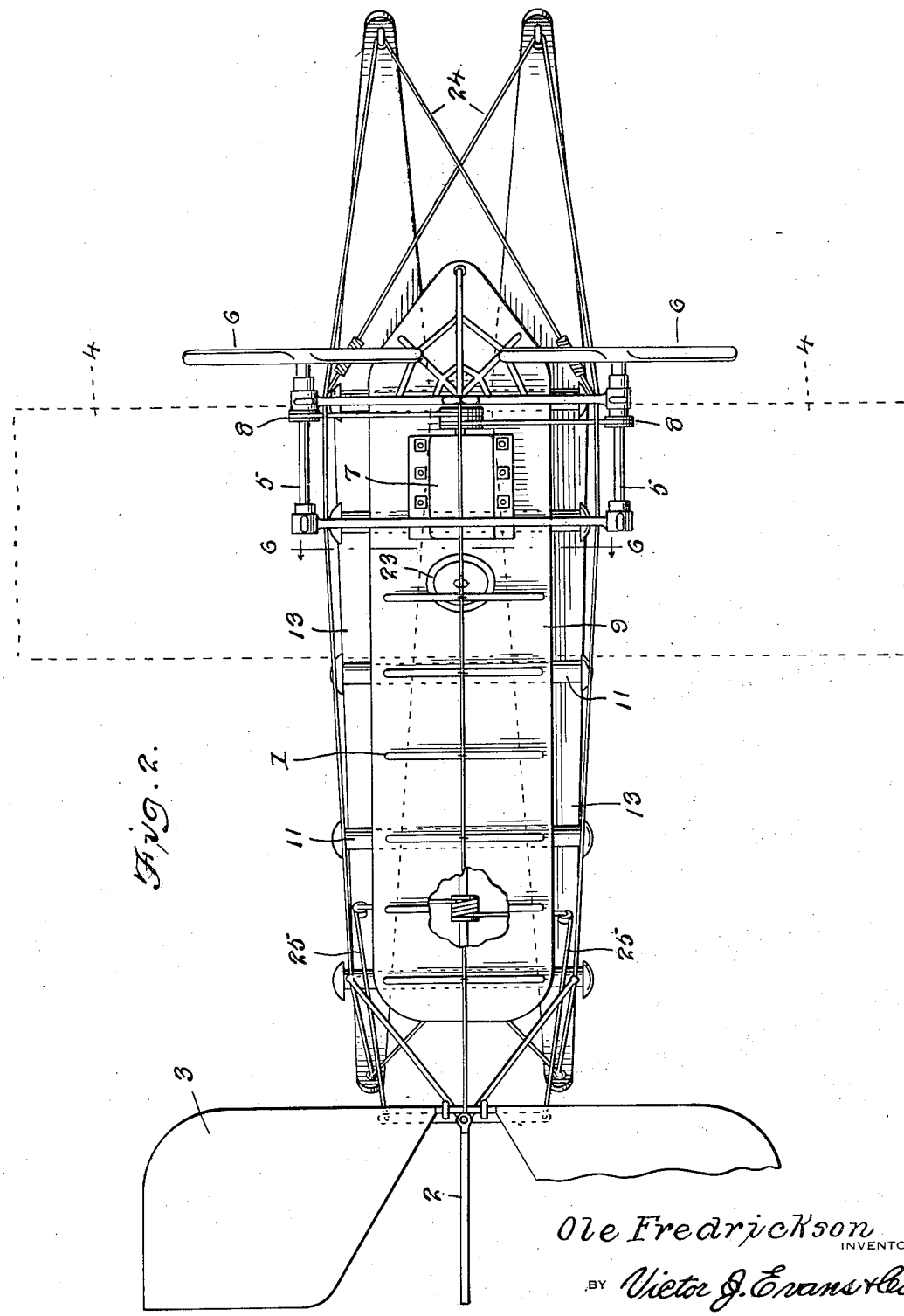
Ole Fredrickson
INVENTOR
BY Victor J. Evans & Co.
ATTORNEY Feb. 6, 1934.     O. FREDRICKSON     1,946,018
SLEIGH
Filed Feb. 1, 1933     4 Sheets-Sheet 3
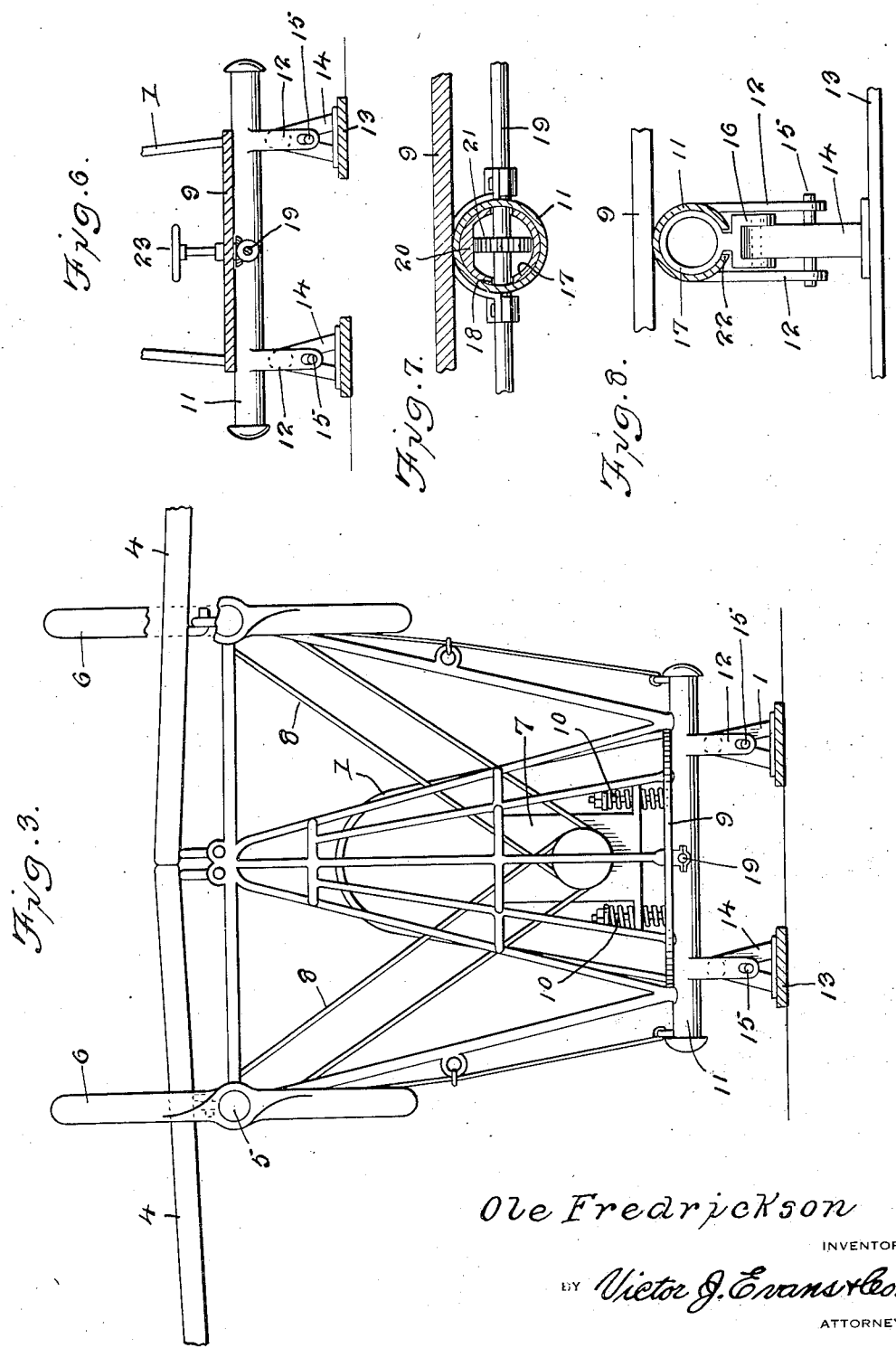
Ole Fredrickson
INVENTOR
BY Victor J. Evans & Co.
ATTORNEY Feb. 6, 1934.   O. FREDRICKSON   1,946,018
SLEIGH
Filed Feb. 1, 1933   4 Sheets-Sheet 4
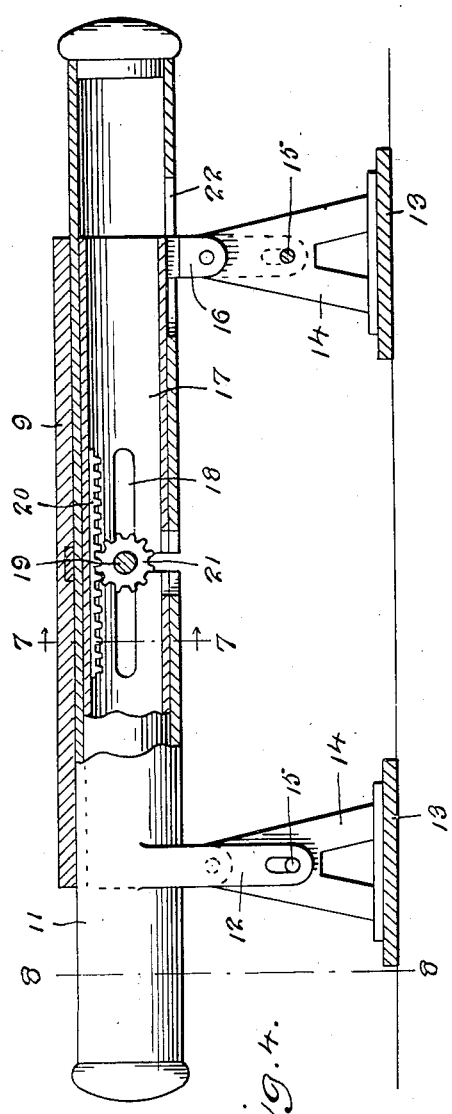
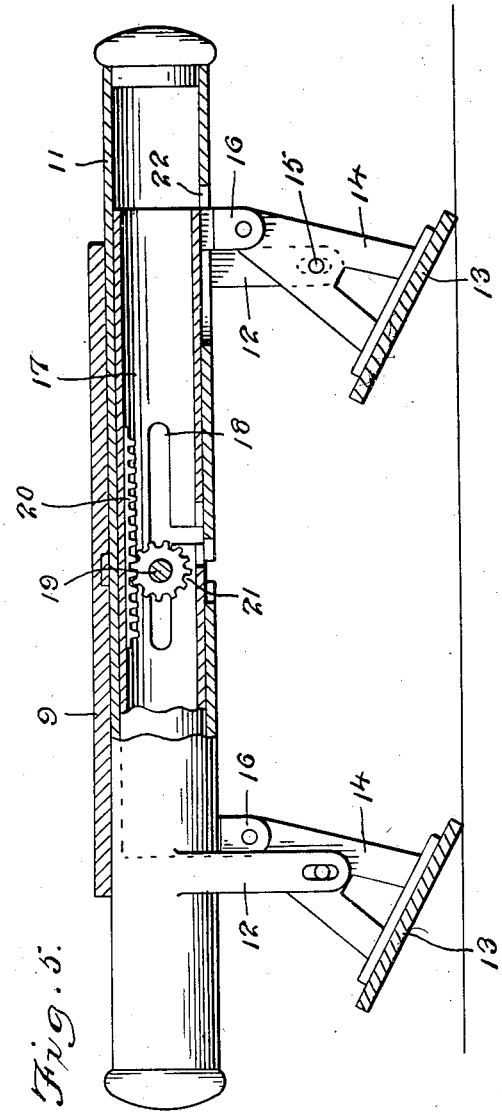
Ole Fredrickson
INVENTOR
BY Victor J. Evans & Co.
ATTORNEY Patented Feb. 6, 1934

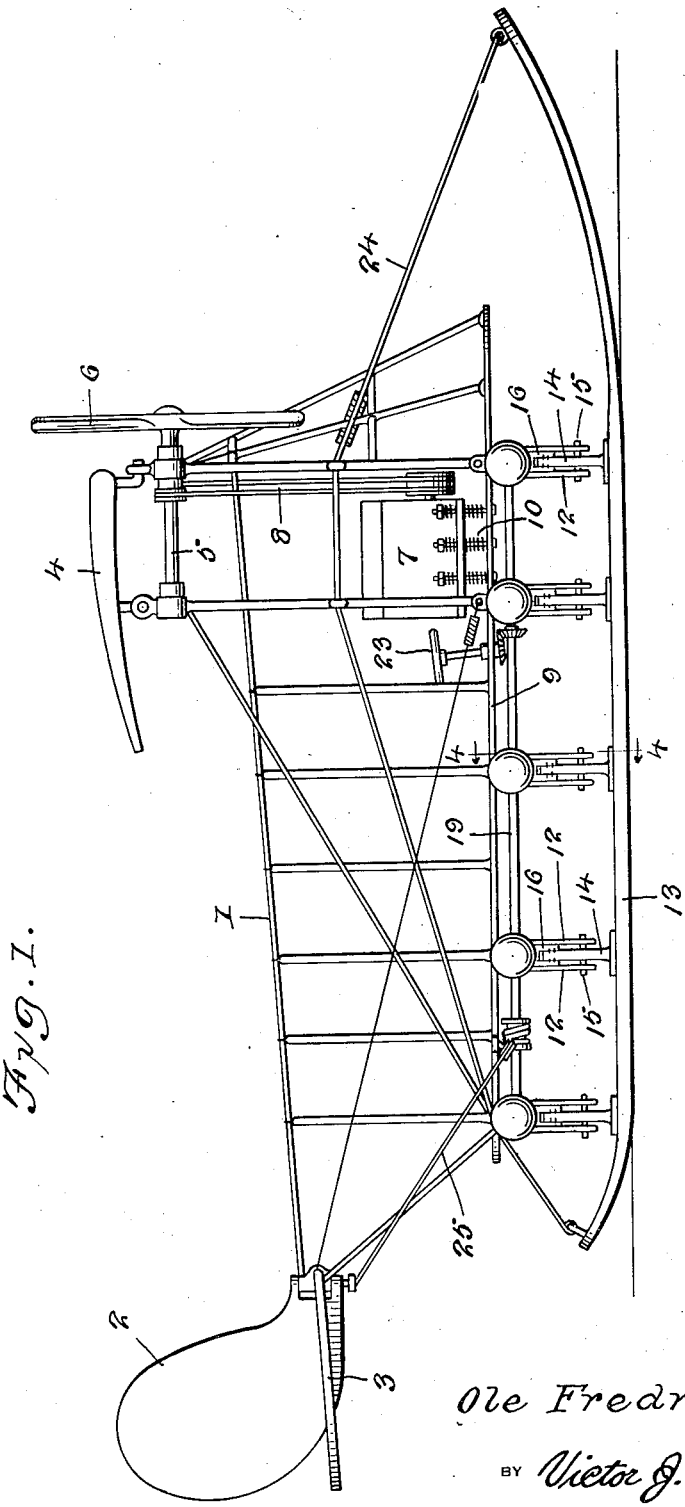

1,946,018

UNITED STATES PATENT OFFICE 1,946,018

SLEIGH

Ole Fredrickson, Great Falls, Mont.

Application February 1, 1933. Serial No. 654,731

2 Claims. (Cl. 244—2)

This invention relates to aerial sleighs, especially adapted to provide rapid transportation over snow and ice and has for the primary object, the provision of a device of the above stated character which may travel efficiently on soft or hard snow and may be easily controlled or steered at high speeds and further will provide more efficient transportation than that obtained by the use of dog sleds.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a sleigh constructed in accordance with my invention.

Figure 2 is a top plan view illustrating the same.

Figure 3 is an end view partly in section showing the power means and mounting therefor and its drive connection with the propellers.

Figure 4 is a fragmentary transverse sectional view illustrating the mounting of the runners and the adjusting means therefor.

Figure 5 is a similar view showing the runners in adjusted position to make turns.

Figure 6 is a fragmentary transverse sectional view illustrating the manual control for effecting the adjustment of the runners.

Figure 7 is a sectional view taken on the line 7—7 of Figure 4.

Figure 8 is a sectional view taken on the line 8—8 of Figure 4.

Referring in detail to the drawings, the numeral 1 indicates a frame for supporting a fuselage preferably of the cabin or closed type. The frame 1 carries a rudder 2 and elevators 3 at the rear end thereof, while the forward end carries removable wings 4. The forward end of the frame has journaled thereto propeller shafts 5 to which propellers 6 are secured. The shafts 5 are driven from an engine 7 through endless belts 8. The engine 7 is supported on the flooring 9 of the frame 1 by adjustable cushion means 10 consisting of bolts extending through the flooring 9 and the base of the engine with adjusting nuts thereon. Coil springs are interposed both between the flooring and the base of the engine on the bolts and between the base of the engine and the nuts providing a construction whereby the engine may be raised and lowered for the purpose of adjusting the belts 8.

Transversely arranged bearing sleeves 11 are secured to the flooring 9 at spaced intervals and each is provided with pairs of depending arms 12. Runners 13 have secured thereto posts 14 carrying pivot pins 15 received in slots of the depending arms, as shown in Figures 4 and 5, the upper ends of the arms terminating above the pivots and are pivotally connected to ears 16 formed on adjusting sleeves 17 slidable in the sleeves 11. The sleeves 11 and 17 are provided with slots 18 to receive a steering shaft 19 extending parallel with the flooring 9. The adjusting sleeves 17 have rack bars 20 secured thereto which mesh with pinions 21 secured to the steering shaft 19. The sleeves 11 are also provided with slots 22 to permit sliding movement of the ears 16 connected to the posts of the runners. A steering mechanism 23 is connected to the steering shaft through gears whereby the pilot or operator may tilt the runners simultaneously for the purpose of steering the sleigh while traveling over snow or ice.

The runners have their ends curved upwardly to facilitate the movement of the runners over snow and it is preferable that the runners taper, as shown in Figure 2. The runners are strengthened by guy wires 24 connected to the frame 1. The rudder 2 is connected to the steering shaft through a cable 25 so that the rudder will be operated simultaneously with the tilting of the runners to aid in steering the sleigh.

A sleigh equipped with the elevators and wings will permit rapid movement of the sleigh over comparatively soft snow without sinking therein.

While I have shown and described the preferred embodiment of my invention, it will be understood that minor changes in construction, combination and arrangement of parts may be made without departing from the spirit and scope of my invention, as claimed.

Having described the invention, I claim:

1. A device of the character set forth, comprising a fuselage frame, aerial steering means on said frame, propellers carried by said frame, an engine adjustably supported on the frame, endless belts between the engine and the propellers, runners pivotally connected to the frame, and means for tilting the runners and simultaneously actuating the aerial steering means.

2. A device of the character set forth, comprising a frame, aerial steering means on said frame, propellers on said frame, means for actuating said propellers, bearing sleeves carried by the frame, depending arms on said bearing sleeve, adjusting sleeves slidable in the bearing sleeve, runners, posts on the runners and pivotally connected to the arms, and to the adjusting sleeves, a manually controlled steering mechanism for operating the adjusting sleeves to tilt the runners in either direction and to simultaneously operate the aerial steering means.

OLE FREDRICKSON.